United States Patent Office 3,652,537
Patented Mar. 28, 1972

3,652,537
EPIERYTHROMYCYLAMINE AND EPIERYTHROMYCYL B AMINE
Eddie H. Massey and Barbara S. Kitchell, Indianapolis, Ind., assignors to Eli Lilly and Company, Indianapolis, Ind.
No Drawing. Filed Nov. 21, 1969, Ser. No. 878,937
Int. Cl. C07c 47/18
U.S. Cl. 260—210 E  3 Claims

ABSTRACT OF THE DISCLOSURE

The novel compounds epierythromycylamine and epierythromycyl B amine are isolated, along with erythromycylamine and erythromycyl B amine, from the hydrogenation of erythromycin oxime and erythromycin B oxime. The epi amines are antibiotically active.

BACKGROUND OF THE INVENTION

The name "erythromycylamine" is in the prior art. Gerzon et al., J. Am. Chem. Soc., 78, 6396, footnote 3, (1956). Djokic and co-workers have also stated in several publications [Tetrahedron Letters, 1645 (1967), Croatica Chemica Acta, 39, 273 (1967) and Great Britain Pat. 1,100,504, published Jan. 24 1968] that erythromycylamine is produced by the reduction of erythromycin oxime by sodium borohydride. Neither of the above procedures yields authentic erythromycylamine. Epierythromycylamine is not mentioned in the prior art.

SUMMARY

This invention provides the novel antibiotic amines, epierythromycylamine and epierythromycyl B amine, prepared by the hydrogenation of erythromycin oxime and erythromycin B oxime, respectively, according to the following reaction sequence:

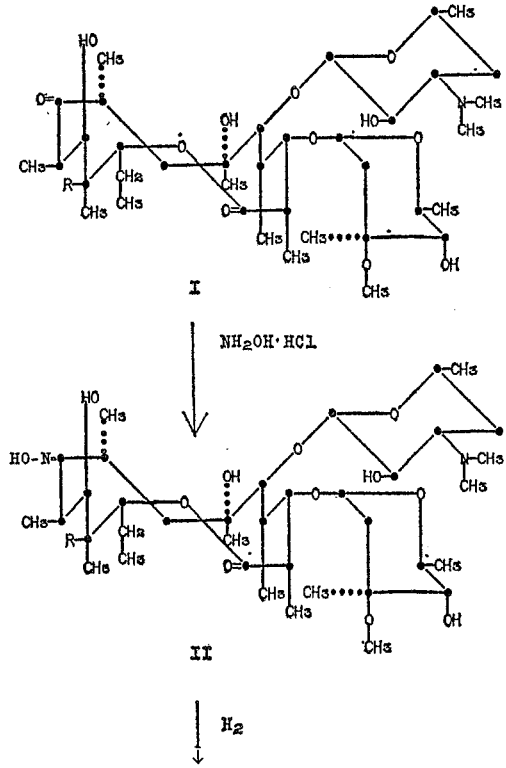

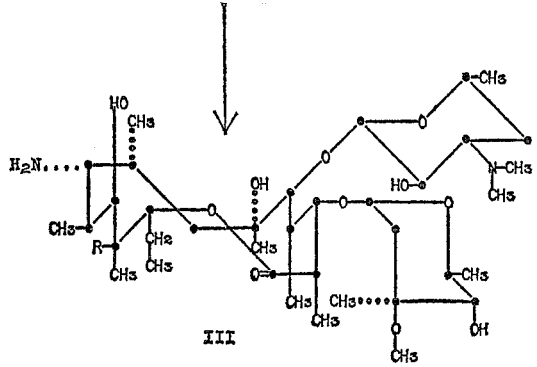

The preparation of the oximes IIa and IIb from the corresponding antibiotic ketones Ia and Ib is disclosed in the copending application of Gerzon and Murphy, Ser. No. 878,936, filed this even date, wherein it is disclosed that the transformation of the oximes (IIa and IIb) to the corresponding amines is carried out using high pressure hydrogenation conditions with platinum black as a catalyst. An aqueous medium containing an equivalent amount of δ-gluconolactone or acetic acid is usually employed. The major products of the above hydrogenation process are the "normal" amines, erythromycylamine and erythromycyl B amine and the epi amines have now been isolated from the hydrogenation mixture in minor amounts. If it is desired to produce the epi amines as the major reaction products, high pressure hydrogenation, preferably at about 1,000 p.s.i., is employed with Raney nickel as the catalyst. Where the epi amine is the major product of the hydrogenation, it is isolated by conventional means from the hydrogenation mixture after filtration of the catalyst. Where the epi amine is a minor product of the hydrogenation, it is isolated by a gradient pH separation.

Epierythromycylamine melts at about 178–180° C. after recrystallization from ether. The compound forms a solvate with benzene melting at about 130° C. when recrystallized from that solvent. The mass spectrum of epierythromycylamine reveals a molecular ion with a m/e value of 734 (calcd. molecular weight=734.7). Thin-layer chromotography over silica G using an ethyl acetate-diethylamine-water (98:2:2) solvent mixture indicates that the epi amine has a $R_f$ value about one half that of the "normal" amine.

Analysis.—Calcd. (percent): C, 60.54; H, 9.48; N, 3.82; O, 26.16. Found (percent): C, 60.35; H, 9.32; N, 3.85; O, 25.95.

Epierythromycylamine has a pronounced antibiotic activity of the order of magnitude of either the parent antibiotic or erythromycylamine. It is effective subcutaneously when administered to mice infected with *S. pyogenes*. $ED_{50}$ (dosage which cures 50 percent of infected animals) for this treatment method for this organism is 6 mg./kg. X2. The minimal inhibitory concentration (mic) for epierythromycylamine against *S. pyogenes* when determined in vitro by the disc plate method using tripticase soy agar as the culture medium is 2.5 mcg. per ml. The minimum inhibitory concentrations of epierythromycylamine for other microorganisms determined by the above methods are given in Table 1.

TABLE 1

| Organism: | MIC in mcg./ml. for Epierythromycylamine |
|---|---|
| Staphylococcus aureus | 12.5 |
| Streptococcus faecalis | 25 |
| Erwinia amylovora | .39 |
| Xanthomonas phaseoli | 12.5 |

Epierythromycyl B amine also has antibiotic activity against gram positive organisms. Thus, both epierythromycyl B amine and epierythromycylamine can be used to control the population of gram positive organisms such as the staphylococci present on equipment, furnishings, walls and floors in dental and medical offices and hospitals. For such use, the antibiotic amine is dissolved in water, preferably in the form of an acid addition salt such as the hydrochloride salt, and usually with the addition of a surface active agent. The resulting solution is then applied to the contaminated surfaces as an ordinary wash solution. In addition, the epierythromycylamines of this invention can be used for treating infections in mammals caused by various microorganisms, and when so used, the methods employed for the administration of erythromycin, its salts and derivatives, to both animals and man, can be adapted directly for the use of epierythromycylamine or epierythromycyl B amine. When employed to treat infections in mammals, epierythromycylamine and epierythromycyl B amine can be administered in dosages ranging from 0.5 to 2 g. per day.

The following specific examples more fully illustrate the nature and scope of this invention:

EXAMPLE I

A reaction mixture is prepared by dissolving 2.5 g. of erythromycin oxime in 450 ml. of methanol. 50 g. of Raney nickel are added and the resulting mixture placed in a high pressure hydrogenation bomb where it is hydrogenated for 24 hours at a hydrogen pressure of 1,000 p.s.i. while being stirred at 1,000 r.p.m. After the hydrogenation has been completed, the catalyst is separated by filtration and the solvent evaporated from the filtrate under reduced pressure. The resulting residue, containing epierythromycylamine formed in the above hydrogenation, is dissolved in water to which sufficient dilute aqueous hydrochloric acid is added to give a solution at pH=4.5. The solution is washed with methylenechloride and then the acidity is adjusted to pH=8.5 using 10 percent sodium hydroxide. This solution is again washed with methylenechloride and the pH further adjusted to about 10.5 with 10 percent sodium hydroxide. Epierythromycylamine free base, present in this solution, is extracted with methylenechloride. The methylenechloride layer is separated and the solvent removed by evaporation in vacuo leaving epierythromycylamine as an amorphous residue. Recrystallization of the residue from ether yields crystalline epierythromycylamine melting at about 178–180° C.

Epierythromycyl B amine is prepared in similar fashion from erythromycin B oxime.

EXAMPLE II

Eight grams of erythromycin oxime are suspended in 350 ml. of an aqueous solution containing 4.2 g. of δ-gluconolactone. 2.5 g. of platinum oxide are added and the mixture subjected to hydrogen atmosphere at 700 p.s.i. for 16 hours at about 28° C. in a hydrogenation bomb. The reaction mixture is removed from the hydrogenation bomb, and the catalyst separated by filtration. 25 ml. of 1 N aqueous sodium hydroxide are added to the filtrate which is then extracted 4 times with 100 ml. portions of methylene chloride. The organic layers are combined and dried, and the solvent removed by evaporation in vacuo. The residue is dissolved in water and extracted, using a gradient pH extraction technique, with methylenechloride at pH=6.0, 7.0, 8.0, 8.5, 9.0 and 10.5. Erythromycylamine is isolated from the extracts at pH= 8.0–9.0. Epierythromycylamine is isolated from the extract at pH=10.5 and is recrystallized from ether as in Example I. Epierythromycylamine can also be purified by a recrystallization of the 1,5-naphthalenedisulfonate salt.

We claim:
1. A compound of the formula:

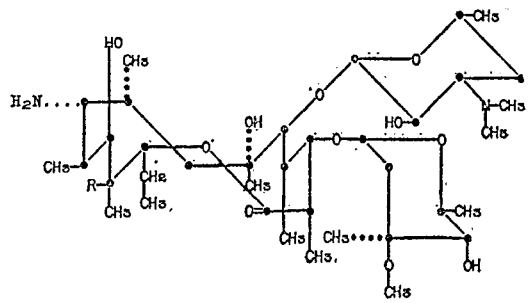

wherein R is H or OH.

2. A compound according to claim 1 wherein R is OH.
3. A process for preparing epierythromycylamine or epierythromycyl B amine which comprises hydrogenating a compound of the formula:

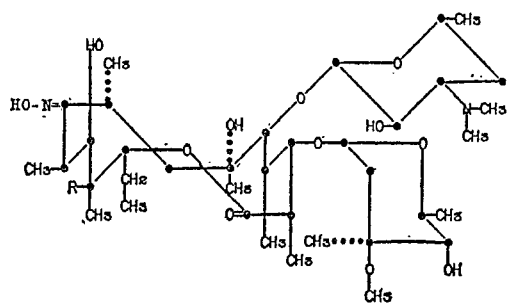

wherein R is H or OH at a hydrogen pressure in the range of 500–2,000 p.s.i. in the presence of an inert solvent and a Raney nickel catalyst.

References Cited
UNITED STATES PATENTS 3,125,569   3/1964   Martin et al. _____ 260—566 A
3,478,014   11/1969  Djokic et al. _____ 260—210 E LEWIS GOTTS, Primary Examiner J. R. BROWN, Assistant Examiner U.S. Cl. X.R.
424—180